United States Patent [19]
Kawakami

[11] Patent Number: 4,823,393
[45] Date of Patent: Apr. 18, 1989

[54] BILL DISCRIMINATING DEVICE

[75] Inventor: Moriatsu Kawakami, Zushi, Japan

[73] Assignee: Laurel Bank Machines Co., Ltd., Tokyo, Japan

[21] Appl. No.: 116,210

[22] Filed: Nov. 3, 1987

[30] Foreign Application Priority Data

Nov. 11, 1986 [JP] Japan .......................... 61-172777[U]

[51] Int. Cl.[4] ................................................ G06K 9/00
[52] U.S. Cl. .................................... 382/7; 340/825.34
[58] Field of Search ................................ 382/34, 7, 1; 340/825.34, 825.3, 825.31; 356/71

[56] References Cited

U.S. PATENT DOCUMENTS 4,179,685 12/1979 O'Maley ................................ 382/7
4,464,786 8/1984 Nishito et al. .......................... 382/7
4,490,846 12/1984 Ishida et al. ........................... 382/7

FOREIGN PATENT DOCUMENTS 2824849 12/1979 Fed. Rep. of Germany .
6118087 1/1984 Japan .

*Primary Examiner*—Donald J. Yusko
*Assistant Examiner*—Eric Oliver Pudpud
*Attorney, Agent, or Firm*—Fleit, Jacobson, Cohn & Price

[57] ABSTRACT

A bill discriminating device which is able to carry out a bill discriminating operation at high speed and precision based on a reduced amount of processing data for bill-type discrimination by extracting and reading only characteristic regions of the bill. According to the present invention, bill discrimination can be carried out by: reading the picture image data output from an image sensor; roughly discriminating the type of bill from the length of the picture image data (corresponding to the width of the bill); reading position data and reference patterns of the characteristic regions corresponding to the type of bill; extracting picture image data (a characteristic pattern) corresponding to the characteristic regions from the position data; and, finally discriminating the type of bill by comparing the characteristic patterns with the reference patterns.

2 Claims, 5 Drawing Sheets

BILL DISCRIMINATING DEVICE

BACKGROUND OF THE INVENTION

The present invention relates to a bill discriminating device which is able to carry out a bill discriminating operation at high-speed based on a reduced amount of processing data for bill type discrimination by extracting and reading only characteristic regions of the bill.

Bill discriminating devices are known and one example is disclosed in Japanese Laid-open Patent Publication No. 18087/1986. This prior art bill discriminating device is adapted to discriminate the type and the genuineness of bills based on data relating to substantially the whole area of the bill by reading picture images present along a band running diagonally across the bill by means of an image sensor.

The bill dispensing device of the prior art is advantageous in that it can discriminate the genuineness of a bill with high precision based upon a minimum amount of data substantially over the whole region of bill. However, since important data required for discriminating the genuineness of a bill does not always appear on the diagonal band of bill, it often happens that important data are missed and only unnecessary data is obtained. A further problem is that a long time is required to carry out the discriminating process with respect to all bits of data read from the diagonal band of the bill.

SUMMARY OF THE INVENTION

It is an object of the present invention to provide a bill discriminating device which is able to carry out bill discrimination with high speed and precision based solely on important data required for bill discrimination.

According to the present invention, there is provided a bill discriminating device comprising: image sensor means "a" for reading a picture image of a bill; picture image data storing means "b" for storing picture image data output from said image sensor; first bill-type discriminating means "c" for discriminating the type of bill by computing the width of the bill based upon said picture image data; position data storing means "d" for storing the positions of characteristic regions of each type of bill; reference pattern storing means "e" for storing reference patterns corresponding to said characteristic regions in each type of bill; and second bill-type discriminating means "f" for discriminating the type of said bill by reading said reference patterns and extracting therefrom picture image data corresponding to said characteristic regions and comparing the extracted picture image data with said reference patterns.

According to the present invention, bill discrimination can be carried out by the following steps:

(1) Reading the picture image data output from the image sensor "a";

(2) Roughly discriminating the type of bill from the length of the picture image data (corresponding to the width of the bill);

(3) Reading position data and reference patterns of the characteristic regions corresponding to the type of bill;

(4) Extracting picture image data (a characteristic pattern) corresponding to the characteristic regions from the position data; and (5) Finally discriminating the type of bill by comparing the characteristic patterns with the reference patterns.

According to this discriminating operation, since the discrimination is carried out based upon the extracted characteristic patterns, it is possible to reduce the amount of processing data and thus realize a device capable of high-speed and precision discriminating operation. It is preferable t use, for example, features of the bill such as numerals, portrait and watermark as the characteristic bill patterns.

BRIEF DESCRIPTION OF THE DRAWINGS

Other objects and advantages of the present invention will become apparent from the following detailed description of a preferred embodiment of the present invention taken in reference to the accompanying drawings in which:

In FIG. 1 which shows a functional block diagram of the basic structure of the bill discriminating device of the present invention, "a" denotes an image sensor, "b" denotes a picture image data storing means, "c" denotes a first bill-type discriminating means, "d" denotes a position data storing means, "e" denotes a reference pattern storing means, and "f" denotes a second bill-type discriminating means. FIG. 2 is a block diagram showing the electrical circuitry of the device. The image sensor 1 is, for example, a CCD (Charge Coupled Device) line-sensor type and is so arranged that it lies perpendicularly to the transferring direction of a bill P. Since the bill P is transferred in parallel with its short sides in this case, the direction of the image sensor 1 becomes parallel to the long sides of the bill P.

Figure 1:
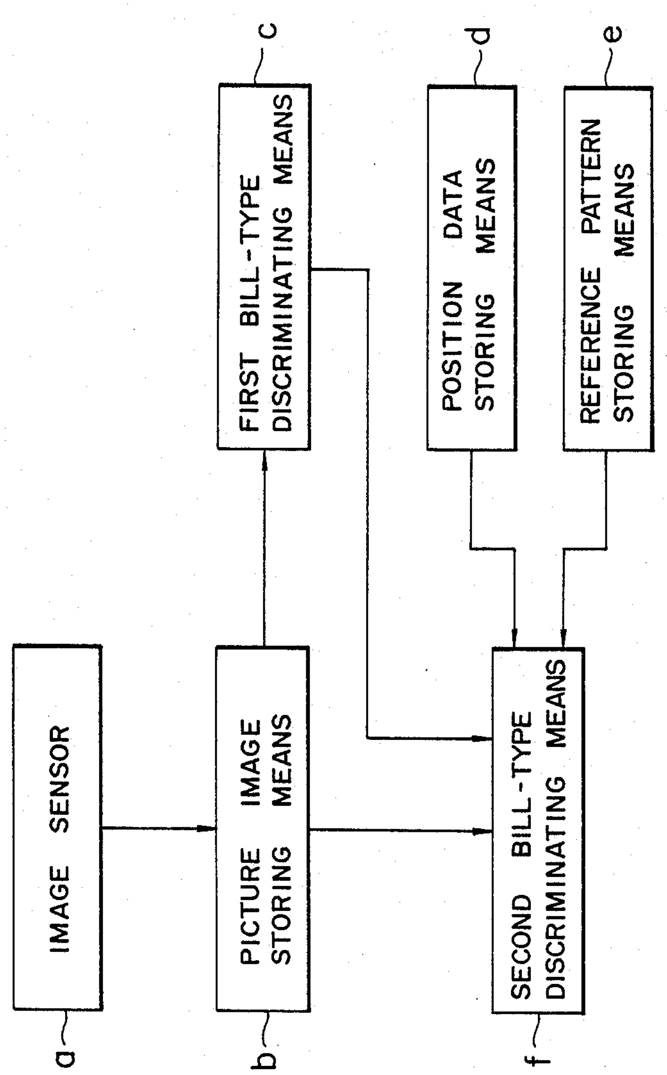
FIG. 1 is a block diagram showing the basic structure of a preferred embodiment of a bill discriminating device of the present invention.

The image sensor 1 is electrically driven by a driver 2. That is, the image sensor 1 is driven by a plurality of pulses output from the driver 2 to read the electric charge of each picture element and to output the read electric charge as sequential picture image data. The picture image data is digitized by a converter (not shown) and stored in a primary memory 3. The primary memory 3 is adapted to store a number of lines and the picture image data necessary for detecting the bill pattern.

The signal from the image sensor 1 is also forwarded to a bill detecting section 4. The bill detecting section 4 constantly monitors the output signal of the image sensor 1 to detect the presence or absence of the bill P and outputs signals to a controller 5 to commence the bill pattern detecting operation when it detects and confirms the presence of the bill P.

The controller 5 controls not only the operation of the driver 2 but also a writing operation for writing the picture image data output from the image sensor 1 into the primary memory 3. Picture image data of the number of lines required for bill discrimination is thus written into the primary memory 3 when the bill P passes through the image sensor 1.

Figure 4:
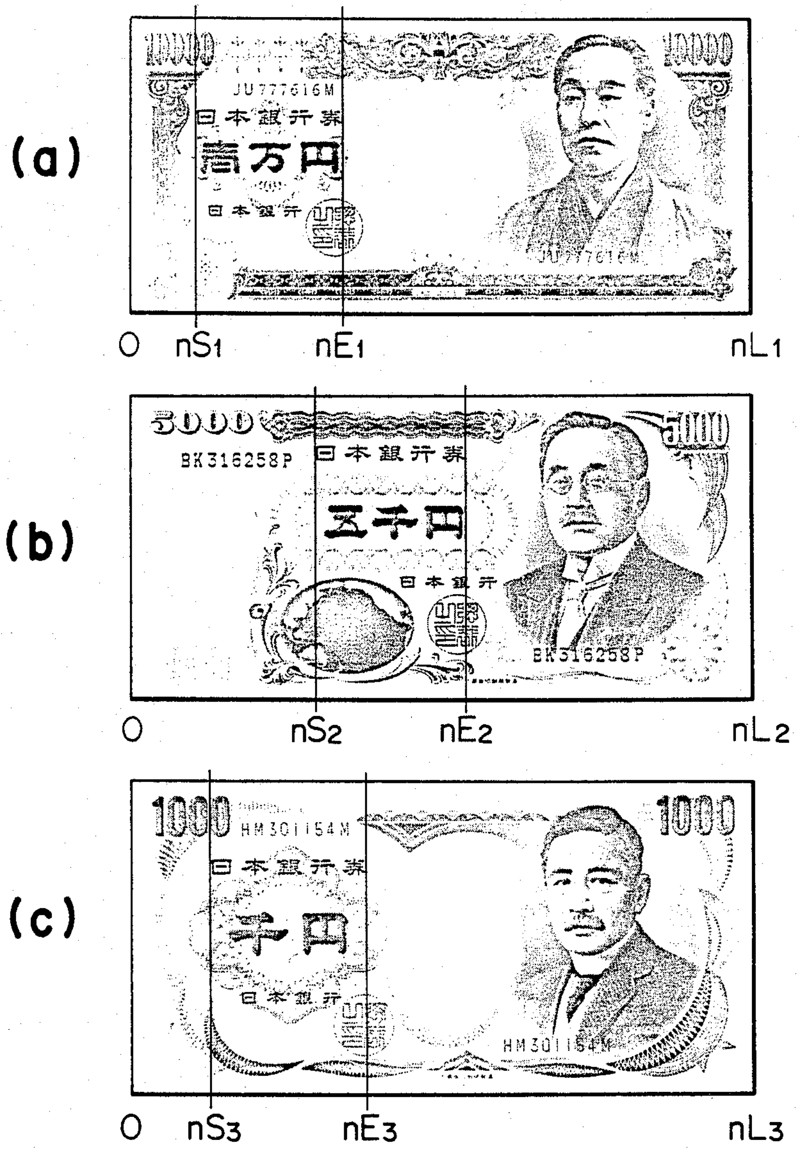
FIGS. 4*a, b, c* are a schematic view of several types of bills for explaining the characteristic data of each type of bill.

A CPU (Central Processing Unit) 6 carries out the bill discriminating operation in accordance with programs and data stored in a ROM (Read-Only Memory) 7 and the picture image data stored in the primary memory 3. Reference width data such as nL1, nL2, nL3, characteristic region position data such as nS1, nE1, nS2, nE2, nS3 and nE3 (FIGS. 4*a,b,c*) and reference patterns are stored in the ROM 7 separately for each type of bill. The reference width data nL1, nL2 and nL3 are data representing the length of the long sides of 1,000 yen, 5,000 yen and 10,000 yen bills respectively. The characteristic region position data nS1, nE1, nS2, nE2, nS3 and nE3 are data representing a starting position (nS) and an ending position (nE) of reading of 1,000 yen, 5,000 yen and 10,000 yen bills respectively. Thus, the characteristic portions of each bill-type are specifically defined by these characteristic position data. The reference patterns are picture image data of the characteristic regions of the bill which are stored beforehand separately for each type of bill so as to be usable as a reference of bill-type discrimination.

Figure 5:
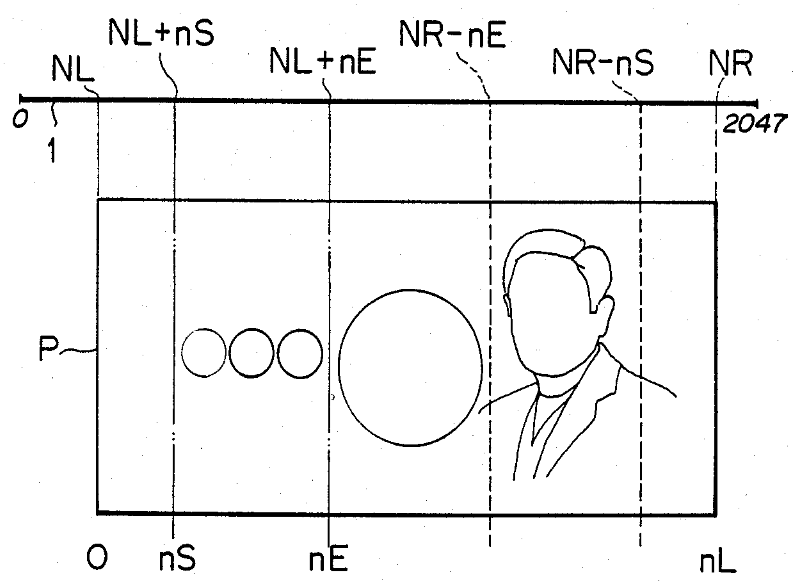
FIG. 5 is a view for explaining the positional relation between the image sensor and the bill.

FIG. 5 shows the relation between the positions of the image sensor 1 and the bill P. The left-end and the right-end of the bill P correspond to positions "NL" and "NR", respectively, of the image sensor 1. Accordingly, the characteristic region position data "nS1" and "nE1" correspond to positions (NL+nS1) and (NR+nE1) respectively of the image sensor 1. Other characteristic region positions also similarly correspond to the positions of the image sensor 1. When the direction of the bill P is reversed, the characteristic region position data "nS1" and "nE1" correspond respectively to positions (NR−nE1) and (NR−nS1) of the image sensor 1, which are equal to (NL+nL1−nE1) and (NL+ nL1−nS1), respectively. Thus it is possible to extract the picture image data corresponding to the characteristic regions of the bill P by shifting the characteristic region positions nS1, nE1, nS2, nE2, nS3 and nE3 by a predetermined amount.

Figure 2:
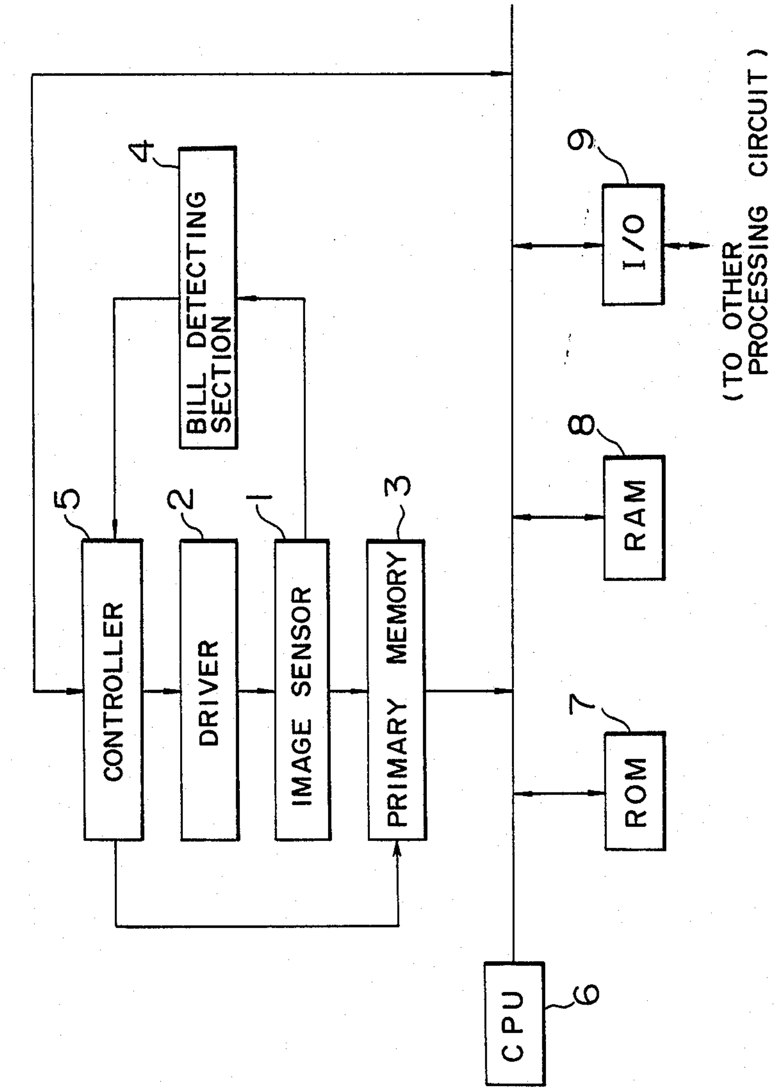
FIG. 2 is a block diagram showing the electrical circuitry of the embodiment of FIG. 1.
Figure 3:
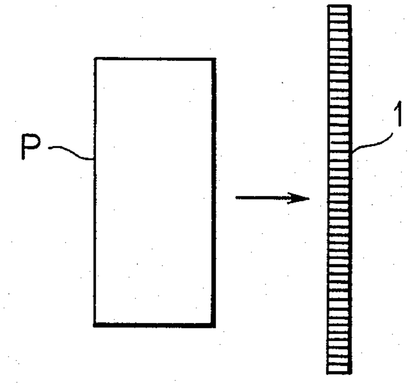
FIG. 3 is a plan view showing the interrelation between the image sensor and the bill.

In FIG. 2, the numeral 8 denotes a RAM used as an operation area, and the numeral 9 denotes an I/O (input-output) interface connecting the CPU 6 to a bill transferring means (not shown).

Figure 6:
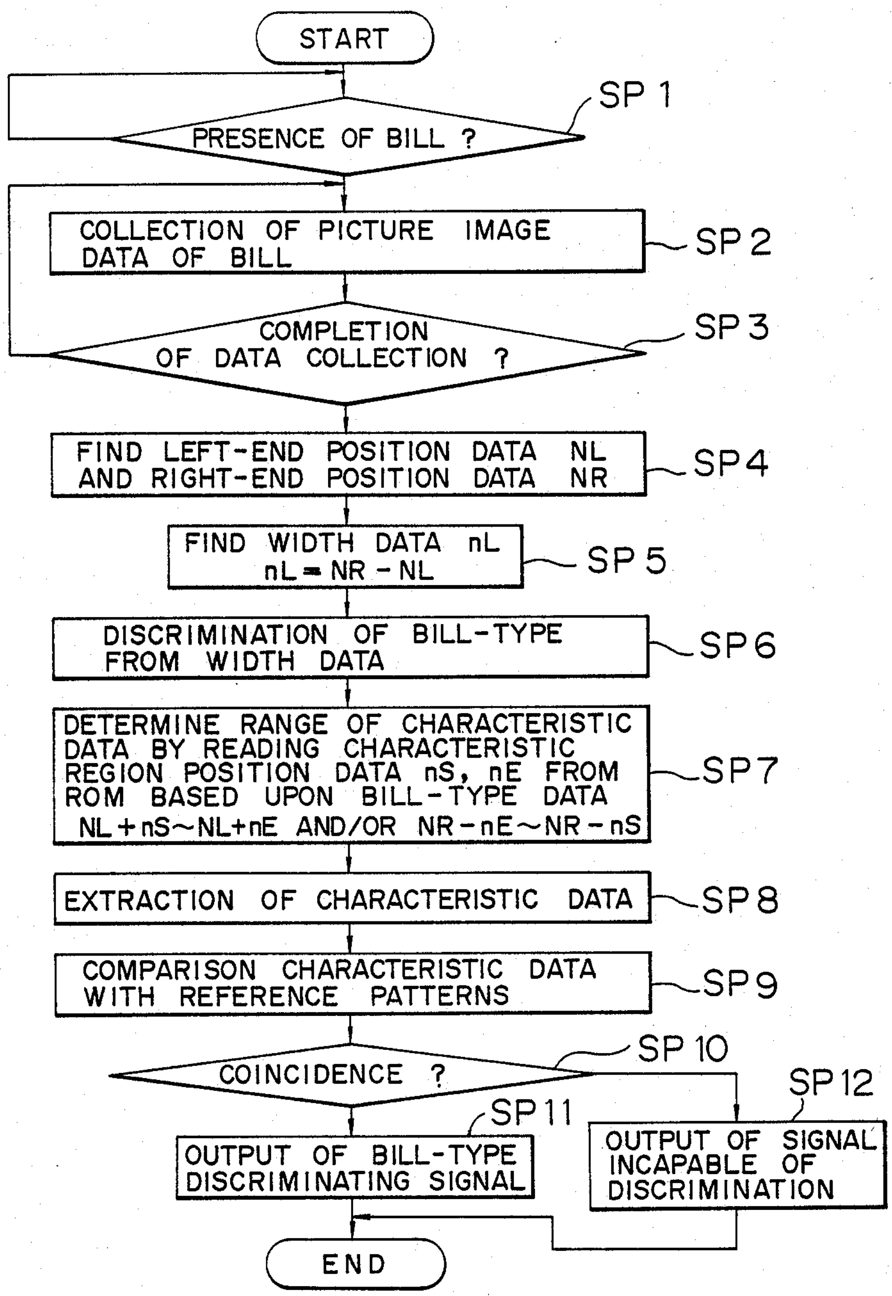
FIG. 6 is a flow-chart for explaining the discriminating operation of the preferred embodiment of the present invention.

The bill discriminating operation of the present invention will now be described with reference to the flowchart of FIG. 6.

The CPU drives the bill transferring means via the I/0 interface 9 to transfer the bill P. When the bill P is detected by the image sensor 1 (step: SP1), it is transmitted by the bill detecting section 4 to the controller 5. Thus the CPU 6 instructs the controller 5 to read the picture image data from the bill P 9 (step: SP2). On completion of the reading of the picture image data (step: SP3), the following operations are carried out based upon the picture image data stored in the primary memory 3.

Firstly, the left-end position data "NL" and the right-end position data "NR" of FIG. 5 are retrieved to determine both end positions of the bill P in the image sensor 1 (step: SP4). Then the width data "nL" of the bill P is calculated from the formula "nL=NR−NL" (step: SP5) to discriminate the type of bill P (step: SP6).

After having discriminated the type of the bill P, the CPU 6 reads the characteristic region position data "nS" and "nE" corresponding to this bill-type from the ROM 7 and determines the reading ranges of the picture image data. That is, the reading ranges (NL+nS−NL+nE) and/or (nR−nE−NR−nS) are thus determined (step: SP7). Then the picture image data within the above reading ranges are extracted from the primary memory 3 (step: SP8). This picture image data becomes the characteristic data representing the characteristic region data of the bill P.

When the characteristic data has been obtained, the CPU 6 reads the reference pattern corresponding to the bill-type from the ROM 7 and compares the characteristic data with reference pattern (step: SP9). As a result, when the characteristic data coincides with the reference pattern, this means that the type of the bill P has been correctly discriminated and thus a signal indicating completion of bill type discrimination is output (step: SP11). On the contrary, when the characteristic data does not coincide with the reference pattern, a signal indicating that bill type discrimination is impossible is output (step: SP12). One discrimination cycle is thus completed.

In the aforesaid embodiment, the characteristic data is extracted along the long sides of the bill. However, similar effects can be obtained by selecting specified positions along the short sides of the bill and extracting the characteristic data therefrom.

When setting a plurality of characteristic region position data and reference patterns, high accurate discrimination can be obtainable by totally utilizing the plural characteristic data.

As explained above, since the bill discriminating device of the present invention carries out the bill-type discriminating operation only by extracting the important characteristic patterns and comparing them with the reference patterns, the following effects are obtainable. (1) It is possible to reduce the amount of processing data and thus to carry out the processing operation at high-speed. (2) Selection of a plurality of the characteristic data enables an improvement in the accuracy of the discrimination.

What is claimed is:

1. A bill discriminating device comprising:

image sensor means for reading a picture image of a bill and generating picture image data output;

picture image data storing means for storing said picture image data output received from said image sensor;

first bill-type discriminating means for preliminarily discriminating a denomination of a bill by computing a width of the bill based upon said picture image data output received from said picture image data storing means;

position data storing means for storing a characteristic region of each denomination of bill, said characteristic region containing said picture image data output to be read for discriminating the denomination of the bill and said characteristic region being selected based upon the denomination preliminarily descriminated by said first bill-type descriminating means;

reference pattern storing means for storing a reference pattern corresponding to said characteristic region of each denomination of bill; and second bill-type discriminating means for discriminating a denomination of the bill preliminarily descriminated by said bill-type discriminating means by reading said reference pattern corresponding to the bill denomination preliminarily descriminated by said first bill-type discriminating means from said reference pattern storing means and reading picture image data output in the characteristic region from said picture image data storing means based upon the output from said position data storing means and comparing the read picture image data output with said reference pattern.

2. A bill discriminating device in accordance with claim 1, wherein said first bill-type discriminating means and said second bill-type discriminating means are included in a central processing unit.

* * * * *